United States Patent
Kumamoto et al.

(10) Patent No.: US 12,491,372 B2
(45) Date of Patent: Dec. 9, 2025

(54) AUTOMATED EXTERNAL DEFIBRILLATOR AND METHOD FOR DISPLAYING STATE OF AUTOMATED EXTERNAL DEFIBRILLATOR

(71) Applicant: Nihon Kohden Corporation, Tokyo (JP)

(72) Inventors: Kota Kumamoto, Saitama (JP); Fumihito Iwai, Saitama (JP); Naoto Akiyama, Saitama (JP); Ryosuke Kuno, Saitama (JP)

(73) Assignee: Nihon Kohden Corporation, Tokyo (JP)

( * ) Notice: Subject to any disclaimer, the term of this patent is extended or adjusted under 35 U.S.C. 154(b) by 398 days.

(21) Appl. No.: 18/007,791

(22) PCT Filed: May 28, 2021

(86) PCT No.: PCT/JP2021/020420
§ 371 (c)(1),
(2) Date: Dec. 2, 2022

(87) PCT Pub. No.: WO2021/246322
PCT Pub. Date: Dec. 9, 2021

(65) Prior Publication Data
US 2023/0241404 A1    Aug. 3, 2023

(30) Foreign Application Priority Data
Jun. 5, 2020    (JP) ................... 2020-098725

(51) Int. Cl.
*A61N 1/39* (2006.01)
(52) U.S. Cl.
CPC ......... *A61N 1/3904* (2017.08); *A61N 1/3993* (2013.01)

(58) Field of Classification Search
None
See application file for complete search history.

(56) References Cited

U.S. PATENT DOCUMENTS 6,366,809 B1 * 4/2002 Olson ............... A61N 1/3975
607/29
9,808,639 B2   11/2017 Delisle
(Continued)

FOREIGN PATENT DOCUMENTS

EP    3122423 A1    2/2017
JP   2018134447 A   8/2018
(Continued)

OTHER PUBLICATIONS

International Search Report and Written Opinion issued in International Application No. PCT/JP2021/020420, issued on Aug. 31, 2021, 7 pages.

*Primary Examiner* — Erica S Lee
(74) *Attorney, Agent, or Firm* — Dorsey & Whitney LLP

(57) ABSTRACT

An automated external defibrillator includes: a self-test executor that executes a self-test for checking a state of the automated external defibrillator; and a display unit that indicates the state of the automated external defibrillator. The display unit makes: a first display when the automated external defibrillator is in a normal state; a second display when the automated external defibrillator is in an abnormal state, and the first display and the second display simultaneously or in a predetermined pattern when the automated external defibrillator is self-testing.

10 Claims, 4 Drawing Sheets

(56) References Cited

U.S. PATENT DOCUMENTS

| | | | |
|---|---|---|---|
| 10,391,296 B2 | 8/2019 | Hoss et al. | |
| 2005/0145198 A1* | 7/2005 | Crist | A01K 15/022 119/718 |
| 2006/0259080 A1 | 11/2006 | Vaisnys et al. | |
| 2011/0213433 A1* | 9/2011 | Vaisnys | A61N 1/3904 607/5 |
| 2015/0265844 A1 | 9/2015 | Powers et al. | |
| 2018/0214706 A1 | 8/2018 | Kutek | |
| 2018/0296848 A1 | 10/2018 | Powers et al. | |

FOREIGN PATENT DOCUMENTS

| | | | |
|---|---|---|---|
| WO | 2015145272 A1 | 10/2015 | |
| WO | 2021246322 A1 | 12/2021 | |

* cited by examiner

AUTOMATED EXTERNAL DEFIBRILLATOR AND METHOD FOR DISPLAYING STATE OF AUTOMATED EXTERNAL DEFIBRILLATOR

This application claims priority under 35 U.S.C. § 371 to International Application No. PCT/JP2021/020420, filed May 28, 2021, entitled "AUTOMATED EXTERNAL DEFIBRILLATOR AND METHOD FOR DISPLAYING STATE OF AUTOMATED EXTERNAL DEFIBRILLATOR," which in turn claims priority to Japanese Patent Application No. 2020-098725, filed Jun. 5, 2020, entitled "AUTOMATED EXTERNAL DEFIBRILLATOR AND METHOD FOR DISPLAYING STATE OF AUTOMATED EXTERNAL DEFIBRILLATOR", each of which is incorporated by reference herein, in the entirety and for all purposes.

TECHNICAL FIELD

The present disclosure relates to an automated external defibrillator and a method for displaying a state of the automated external defibrillator.

BACKGROUND ART

Generally, automated external defibrillators (hereinafter also abbreviated to AEDs) are mounted with self-test functions. In such a self-test, for example, a remaining level of a battery, a connection state with a defibrillation pad, whether various circuits operate normally or not, etc. are checked so that it is determined whether the AED can be used normally or not.

It is general that a result of the self-test is indicated by a predetermined indicator. For example, Patent Literature 1 discloses an AED that notifies a user of a result of a self-test in such a manner that the AED turns on a green LED (Light Emitting Diode) when there is no problem in the result of the self-test, or turns on a red LED when a malfunction or the like has been found by the self-test.

CITATION LIST

Patent Literature

PTL 1: JP-A-2018-134447

SUMMARY OF INVENTION

Technical Problem

However, Patent Literature 1 does not disclose a method for indicating that the AED is self-testing. Even if the state in which the AED disclosed in Patent Literature 1 is self-testing is indicated by turning on the red LED, the case where the AED is self-testing and the case where the malfunction has occurred in the AED cannot be distinguished from each other.

An object of the present disclosure is to provide an automated external defibrillator that can notify a user of a case where the automated external defibrillator is normal, a case where abnormality such as a malfunction has occurred in the automated external defibrillator, and a case where the automated external defibrillator is self-testing in discriminable modes respectively, and a method for displaying a state of the automated external defibrillator.

Solution to Problem

According to a first aspect of the present disclosure, there is provided an automated external defibrillator including:

a self-test executor that executes a self-test for checking a state of the automated external defibrillator; and
a display unit that indicates the state of the automated external defibrillator, wherein the display unit
makes a first display when the automated external defibrillator is in a normal state,
makes a second display when the automated external defibrillator is in an abnormal state, and
makes the first display and the second display simultaneously or in a predetermined pattern when the automated external defibrillator is self-testing.

According to a second aspect of the present disclosure, there is provided a method for displaying a state of an automated external defibrillator, the method making the automated external defibrillator perform
an execution step of executing a self-test for checking the state of the automated external defibrillator; and
a display step of indicating the state of the automated external defibrillator; wherein: the display step includes
a first display step of making a first display when the automated external defibrillator is in a normal state,
a second display step of making a second display when the automated external defibrillator is in an abnormal state, and
a third display step of making the first display and the second display simultaneously or in a predetermined pattern when the automated external defibrillator is self-testing.

Advantageous Effects of Invention

According to the aforementioned configuration, it is possible to notify a user of the case where the automated external defibrillator is normal, the case where abnormality such as a malfunction has occurred in the automated external defibrillator, and the case where the automated external defibrillator is self-testing in discriminable modes respectively. More specifically, a mode in which the first display and the second display are displayed simultaneously or in the predetermined pattern is set as a third kind of display mode in addition to the two kinds of display modes, i.e. the first display and the second display. Thus, the two kinds of display modes, i.e. the first display and the second display, can be used to notify the user of the three kinds of states, i.e. the normal state, the abnormal state and the self-testing state.

BRIEF DESCRIPTION OF DRAWINGS

FIG. 3A illustrates an example of a first display mode, FIG. 3B illustrates an example of a second display mode, FIG. 3C illustrates an example of a third display mode, and FIG. 3D illustrates another example of the third display mode.

FIG. 4A illustrates an example of a third display mode, and FIG. 4B illustrates another example of the third display mode.

DESCRIPTION OF EMBODIMENTS

An embodiment of the present disclosure will be described below by way of example with reference to the drawings. In the following description, identical or equivalent elements will be designated by the same reference signs or names correspondingly and respectively even in different drawings, and duplicate description thereof will be therefore omitted appropriately.

Figure 1:
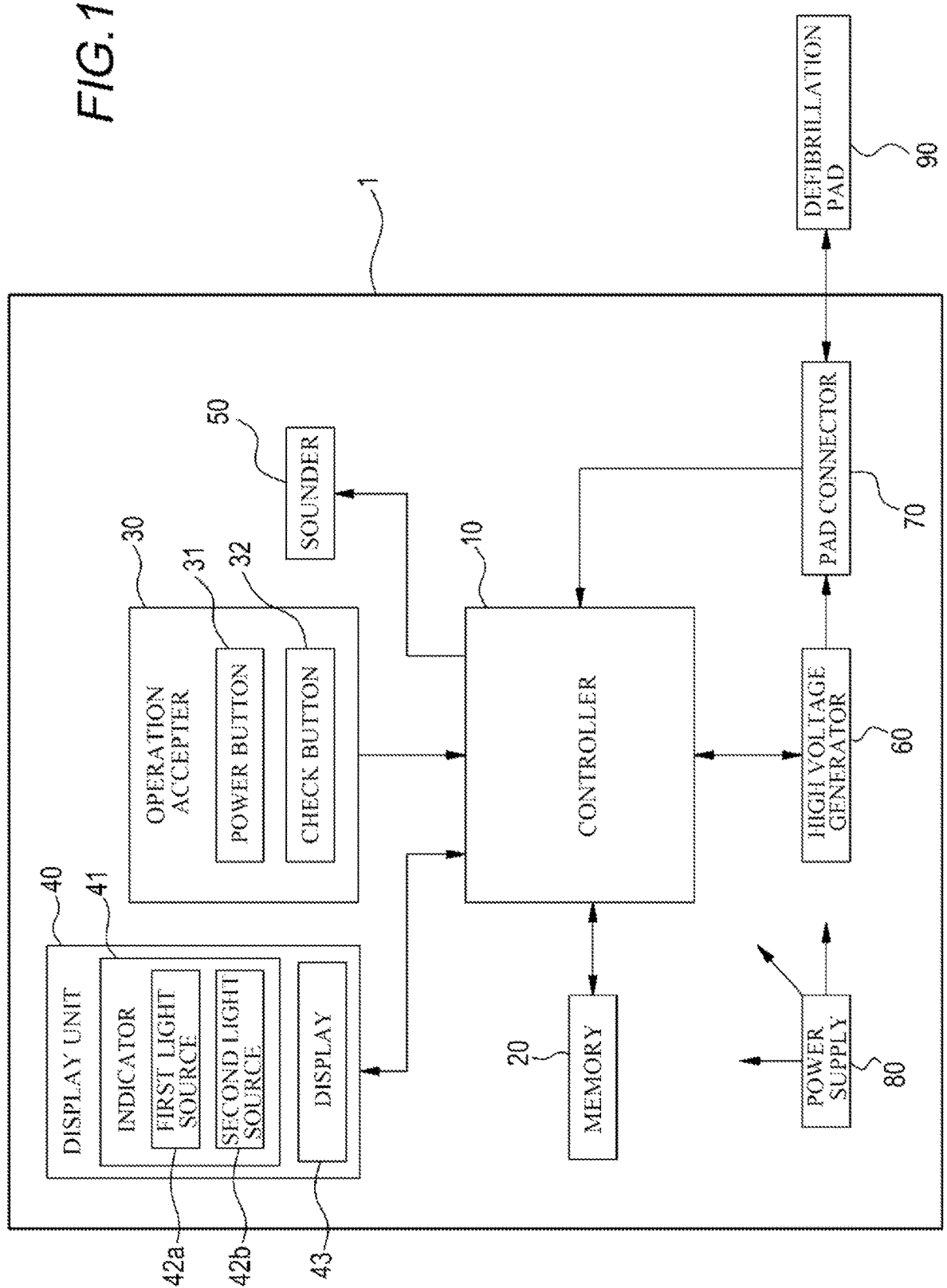
FIG. 1 is a block diagram illustrating an example of a configuration of an automated external defibrillator according to an embodiment of the present disclosure.

First, respective processors constituting an AED 1 will be described using FIG. 1. FIG. 1 is a block diagram illustrating an example of a configuration of the AED 1 according to the embodiment of the present disclosure. The AED 1 is provided with a controller 10, a memory 20, an operation accepter 30, a display unit 40, a sounder 50, a high voltage generator 60, a pad connector 70 and a power supply 80.

The controller 10 reads and executes a program etc. stored in the memory 20 to control various actions of the AED 1. The controller 10 can include a processor such as a CPU (Central Processing Unit), a memory such as an ROM (Read Only Memory) or an RAM (Random Access Memory), a real time clock, an A/D converter, etc.

The controller 10 controls various actions for life rescue (hereinafter also referred to as "life rescue actions") such as energy charging/discharging control, sequence control, A/D conversion, and electrocardiogram analysis. In addition, the controller 10 controls execution of a self-test of the AED 1. That is, the controller 10 functions also as a self-test executor. The self-test may be executed when a setting time instant set in advance came, or when the operation accepter 30 has accepted a predetermined operation input (e.g. a check button 32 which will be described later has been pressed down).

In the self-test, for example, the controller 10 performs check of circuits for controlling life rescue actions (such as confirmation of a time constant of an electrocardiogram input circuit, confirmation of a circuit recognizing paddle contact, and confirmation of an energy value during charging into a capacitor/during internal discharging), check of the power supply 80 (such as a voltage value, a remaining value of a battery, and a value of current consumption), check of a defibrillation pad 90 connected to the pad connector 70 (such as a resistance value of the pad and confirmation of expiry date for use), etc. to confirm whether they are normal or abnormal. A result of the self-test (i.e. the AED 1 is in a normal state or an abnormal state) is displayed on an indicator 41 which will be described later. In addition, even during execution of the self-test, display for notifying a user of the execution of the self-test can be made on the indicator 41.

The memory 20 stores a necessary program for action of the AED, audio data, an adjustment value, electrocardiogram data during the life rescue, the result of the self-test, etc. The memory 20 may include, for example, a secondary memory device such as a hard disk. A part of the memory 20 may be an external memory device that can be detachably attached to the AED 1.

The operation accepter 30 accepts an operation input from the user. The operation accepter 30 includes a power button 31 and the check button 32. The power button 31 is a button for starting a life rescue action. The check button 32 is a button for starting a self-test. In addition, although not illustrated, the operation accepter 30 may be provided with a shock button for executing an electric shock, a button for setting a setting time instant of the self-test, etc.

The display unit 40 includes the indicator 41 and a display 43. The indicator 41 displays a state of the AED 1. When the AED 1 is in a normal state, the indicator 41 makes a first display as a first display mode. In addition, when the AED 1 is in an abnormal state, the indicator 41 makes a second display as a second display mode. In addition, when the AED 1 is self-testing, the indicator 41 makes the first display and the second display simultaneously or in a predetermined pattern as a third display mode. Here, the "predetermined pattern" is not limited as long as the pattern uses both the first display and the second display. The "predetermined pattern" may be, for example, a pattern in which one or more times of the first display and one or more times of the second display are made alternately. Specifically, the "predetermined pattern" may be a pattern in which the first display and the second display are made alternately and once at a time, or a pattern in which one of the first display and the second display made once and the other of the first display and the second display continuously made a plurality of times are repeated alternately, or a pattern in which the first display continuously made a plurality of times and the second display continuously made a plurality of times are repeated alternatively. In addition, the number of times of the first display and the number of times of the second display in the predetermined pattern does not have to be constant. The pattern may be, for example, a pattern in which the first display is made once, the second display is then made twice, the first display is then made twice, and the second display is then made three times.

The indicator 41 includes a first light source 42a and a second light source 42b. The first display is to, for example, turn on the first light source 42a to thereby display a first color (such as a green color or a blue color). The second display is to, for example, turn on the second light source 42b to thereby display a second color (such as a red color or a yellow color) different from the first color. When the first display and the second display are made simultaneously, for example, the first color and the second color are displayed simultaneously at separate places on the indicator 41 or a mixed color of the first color and the second color is displayed on the indicator 41. In addition, when the first display and the second display are made alternately, for example, the first color and the second color are displayed alternately on the indicator 41. Specific examples of these display modes will be described in detail in the following paragraphs by use of FIGS. 3A to 3D and FIGS. 4A and 4B.

It is preferable that the first light source 42a and the second light source 42b are LED light sources. The first light source 42a may be an LED light source which can emit light of the first color singly or may be an LED light source which can emit light of the first color in combination with a fluorescent substance. Similarly, the second light source 42b may be an LED light source which can emit light of the second color singly or may be an LED light source which can emit light of the second color in combination with a fluorescent substance. In addition, the indicator 41 may be provided with RGB light sources constituted by the first light source 42a, the second light source 42b, and a third light source (not illustrated). In this case, each of the first color and the second color may be a single color selected from RGB, or a mixed color formed by controlling an output ratio among the RGB light sources.

Incidentally, the indicator 41 may be provided with a magnetic reversal disk in place of the first light source 42a and the second light source 42b. In this case, when the AED 1 is normal, one face of the magnetic reversal disk is displayed (first display) as a first display mode. In addition, when the AED 1 is abnormal, the other face of the magnetic reversal disk is displayed (second display) as a second display mode. In addition, when the AED 1 is self-testing, the face and the other face of the magnetic reversal disk are displayed alternately as a third display mode.

The display 43 is, for example, a liquid crystal display. The display 43 displays an instruction to the user as a figure or characters or displays an electrocardiogram signal. The display 43 may be provided with a touch panel or may function also as the operation accepter 30. Incidentally, according to another configuration, which is not provided with the display 43 in order to miniaturize a housing of the AED 1, an instruction or information presentation to the user may be performed by various indicators or a speaker.

The sounder 50 issues various instructions to the user by voice with reference to the audio data stored in the memory 20. In addition, when abnormality has been found due to the self-test, the sounder 50 emits a warning sound to notify the user of the abnormality.

The high voltage generator 60 carries out charging and discharging of energy used for defibrillation in accordance with a control signal from the controller 10. The pad connector 70 is connected to the defibrillation pad 90. The energy discharged by the high voltage generator 60 is transmitted to a person in need for rescue through the pad connector 70 and the defibrillation pad 90. In addition, the defibrillation pad 90 fetches an electrocardiogram signal of the person in need for rescue. The electrocardiogram signal is, for example, filtered and amplified before being transmitted to the controller 10.

The power supply 80 includes the battery. The power supply 80 converts electric power supplied from the battery into a required voltage, and supplies the electric power to the aforementioned processors. The remaining level of the battery is confirmed by the self-test.

Figure 2:
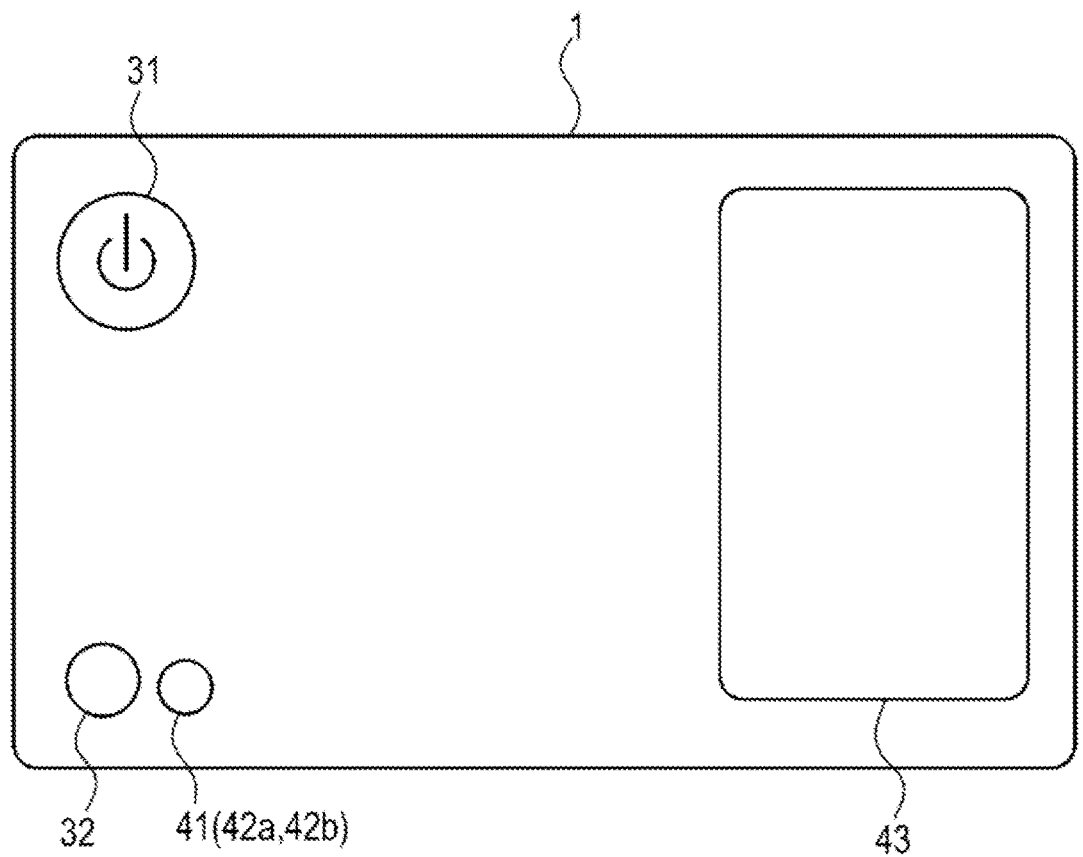
FIG. 2 is a top view schematically illustrating an example of a configuration of an external appearance of the automated external defibrillator according to the embodiment of the present disclosure.

Next, a configuration of an external appearance of the AED 1 according to the embodiment of the present disclosure will be described by use of FIG. 2. FIG. 2 is a top view schematically illustrating an example of the configuration of the external appearance of the AED 1. The AED 1 is substantially shaped like a rectangular parallelepiped. The power button 31, the check button 32, the indicator 41 and the display 43 are provided in an upper face of the AED 1. In addition, although not illustrated, the AED 1 may be provided with components (such as the shock button) other than these components. The position or size of each of the components is not limited particularly and can be suitably determined based on various viewpoints.

The indicator 41 includes the first light source 42a and the second light source 42b internally. Since the indicator 41 indicates that the AED 1 is self-testing or the result of the self-test, the indicator 41 is preferably disposed in the vicinity of the check button 32.

Various display modes displayed on the indicator 41, i.e. a method for displaying the state of the AED 1 will be described below in detail by use of FIGS. 3A to 3D and FIGS. 4A and 4B. The AED 1 performs an execution step of executing a self-test by the controller 10, and a display step of indicating the state of the AED 1 (whether the AED 1 is abnormal or not by the self-test) by use of the indicator 41. The display step includes a first display step of making a first display when the AED 1 is in a normal state, a second display step of making a second display when the AED 1 is in an abnormal state, and a third display step of making the first display and the second display simultaneously or in a predetermined pattern when the AED 1 is self-testing.

Figure 3A:
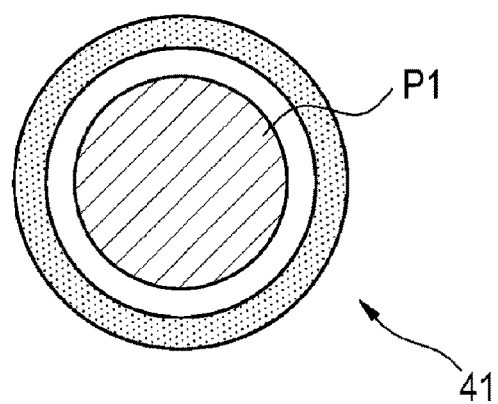
FIGS. 3A to 3D are schematic diagrams illustrating examples of display modes of an indicator.

FIGS. 3A to 3D are schematic diagrams illustrating examples of display modes of the indicator 41. FIG. 3A illustrates an example of a first display mode. In FIG. 3A, a first display P1 is displayed inside a frame of the indicator 41. The first display P1 is display of a first color that is, for example, attained by turning on the first light source 42a. When it is determined that the AED 1 is normal based on the self-test, the first display P1 is displayed on the indicator 41 as the first display step for a predetermined time (e.g. five seconds) after the self-test or in a period until a next self-test is executed after the self-test.

Figure 3B:
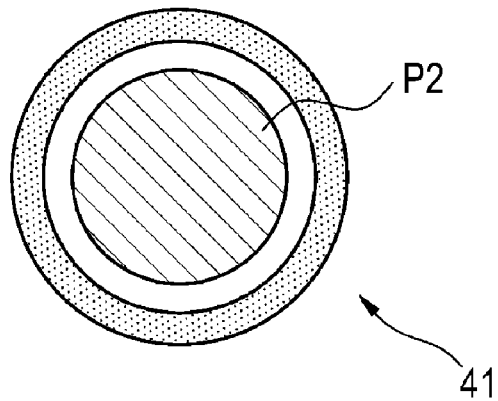

FIG. 3B illustrates an example of a second display mode. In FIG. 3B, a second display P2 is displayed inside the frame of the indicator 41. The second display P2 is display of a second color that is, for example, attained by turning on the second light source 42b. When it is determined that the AED 1 is abnormal based on the self-test, the second display P2 is displayed in the indicator 41 as the second display step for a predetermined time (e.g. five seconds) after the self-test, in a period until a next self-test is executed after the self-test, or in a period until the abnormality is cancelled.

Figure 3C:
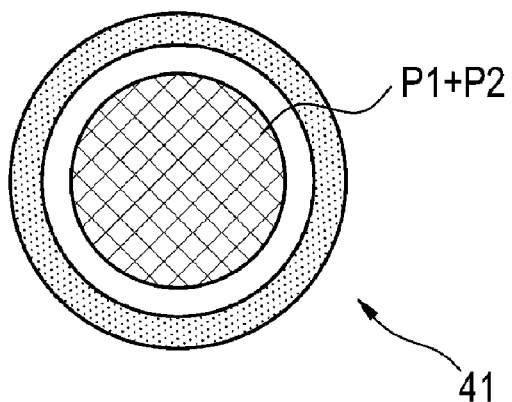

FIG. 3C illustrates an example of a third display mode. In FIG. 3C, both the first display P1 and the second display P2 are displayed simultaneously inside the frame of the indicator 41. That is, a mixed color of the first color and the second color is displayed inside the frame of the indicator 41.

Figure 3D:
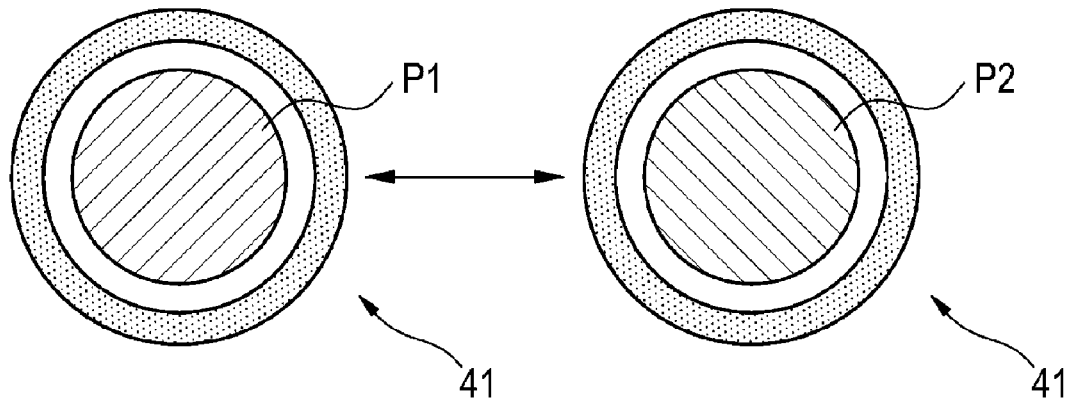

FIG. 3D illustrates another example of the third display mode. In FIG. 3D, the first display P1 and the second display P2 are displayed in a predetermined pattern inside the frame of the indicator 41. Specifically, the first color and the second color are lit alternately inside the frame of the indicator 41. It is preferable that each lighting time of the first color and each lighting time of the second color in the third display step are shorter than the lighting time of the first color in the first display step and the lighting time of the second color in the second display step respectively. Each lighting time of the first color and each light time of the second color in the third display step may be, for example, 0.5 seconds or 0.2 seconds. When a third color can be displayed inside the indicator 41, the first to third colors may be lit in turn. Display illustrated in of FIG. 3C or 3D can be made as the third display step in a period from starting the self-test until displaying the result of the self-test.

Figure 4A:
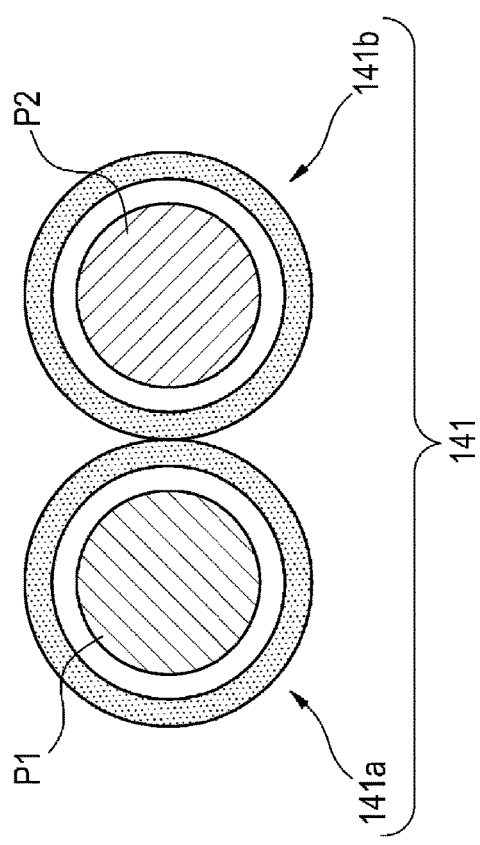
FIGS. 4A and 4B are schematic diagrams illustrating examples of display modes of an indicator different from that in the examples of FIGS. 3A to 3D when the indicator is used.
Figure 4B:
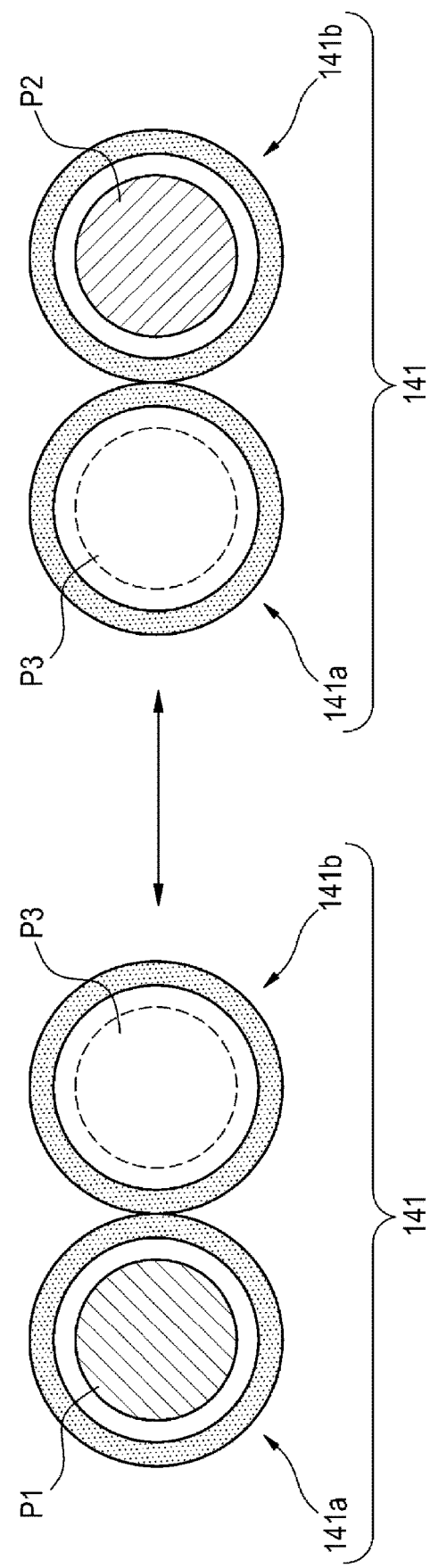

FIGS. 4A and 4B are schematic diagrams illustrating examples of display modes of an indicator 141 different from that in the examples of FIGS. 3A to 3D in a case where the indicator 141 is used. The indicator 141 includes a first indicator 141a and a second indicator 141b. The first indicator 141a includes the first light source 42a internally. The second indicator 141b includes the second light source 42b internally. The positions of the first indicator 141a and the second indicator 141b are not limited particularly. However, it is preferable that the first indicator 141a and the second indicator 141b are positioned adjacently to each other. The first indicator 141a and the second indicator 141b may be positioned inside one and the same frame.

FIG. 4A illustrates an example of the third display mode in the case where the indicator 141 is used. In FIG. 4A, a first display P1 is displayed inside a frame of the first indicator 141a. In addition, a second display P2 is displayed inside a frame of the second indicator 141b. That is, in the example of FIG. 4A, the first display P1 and the second display P2 are displayed simultaneously at different places.

FIG. 4B illustrates another example of the third display mode in the case where the indicator 141 is used. In the example of FIG. 4B, a state illustrated on a left side of FIG. 4B and a state illustrated on a right side of FIG. 4B are repeated alternately. Specifically, a state in which the first display P1 is displayed inside the frame of the first indicator 141a and the inside of the frame of the second indicator 141b is in an extinguished state P3 (a state in which a light source is turned off), a state in which the inside of the frame of the first indicator 141a is in the extinguished state P3 and the second display P2 is displayed inside the frame of the second indicator 141b are repeated alternately. The display illustrated in FIG. 4A or 4B can be displayed as the third display step in a period from starting the self-test until displaying the result of the self-test.

Incidentally, in the case where the indicator 141 is used, the state illustrated on the left side of the FIG. 4B is the first display state, i.e. a state in which the first display step is being executed. In addition, the state illustrated on the right side of FIG. 4B is the second display state, i.e. a state in which the second display step is being executed.

Successively, effects that can be obtained by the respective constituents included in the AED 1 and the method for displaying the state of the AED 1 according to the present embodiment will be described.

The AED 1 makes the first display when the AED 1 is in a normal state, makes the second display when the AED 1 is in an abnormal state, and makes the first display and the second display simultaneously or in a predetermined pattern when the AED 1 is self-testing. Thus, the user can discriminate the three kinds of states of the AED 1 from one another. In addition, the three kinds of display modes can be realized by the two kinds of displays, i.e. the first display and the second display, thereby contributing to cost reduction.

In addition, the first display P1 is set to turn on the first light source 42a to thereby display the first color on the display unit 40 (the indicator 41), and the second display P2 is set to turn on the second light source 42b to thereby display the second color different from the first color on the display unit 40 (the indicator 41). Thus, the user can be notified of the respective states of the AED 1 simply and briefly.

In addition, due to the first light source 42a and the second light source 42b that are formed as the LED light sources, suppression of power consumption, elongation of the life of each of the light sources, and miniaturization of the display unit can be realized easily.

The AED 1 has a configuration in which a plurality of colors including at least the first color and the second color are displayed in turn in the case where the AED 1 is self-testing. Thus, a failure in turning on the first light source or the second light source can be detected. When, for example, the self-test is executed in a situation that the second light source 42b cannot be turned on, the second color is not lit after the first color is lit, but the first color is then lit again. Therefore, the user can immediately notice the failure of the second light source 42b. That is, the third display mode indicating that the AED 1 is self-testing is set as a mode in which the plurality of colors including at least the first color and the second color are displayed in turn. Thus, it is also possible to check the action of the indicator 41 while executing the self-test.

The length of each time of the first display made in the case where the AED 1 is self-testing is made shorter than the length of the time for which the first display is made in the case where the AED 1 is in the normal state, and the length of each time of the second display made in the case where the AED 1 is self-testing is made shorter than the length of the time for which the second display is made in the case where the AED 1 is in the abnormal state. Thus, the user can grasp the states of AED 1 not only by the kinds of displays but also by the lighting times of the first display and the second display.

The aforementioned embodiment is merely exemplary in order to make the presently disclosed subject matter easy to understand. The configuration according to the aforementioned embodiment can be changed/improved properly without departing from the gist of the presently disclosed subject matter.

REFERENCE SIGNS LIST

1: automated external defibrillator (AED)
10: controller (self-test executor)
20: memory
30: operation accepter
31: power button
32: check button
40: display unit
41, 141: indicator
42a: first light source
42b: second light source
43: display
50: sounder
60: high voltage generator
70: pad connector
80: power supply
90: defibrillation pad

The invention claimed is:

1. An automated external defibrillator comprising:
a self-test executor that executes a self-test for checking a state of the automated external defibrillator; and
a display unit that indicates the state of the automated external defibrillator, wherein
the display unit
makes a first display when the automated external defibrillator is in a normal state,
makes a second display when the automated external defibrillator is in an abnormal state, and
makes the first display and the second display simultaneously or in a predetermined pattern when the automated external defibrillator is self-testing, wherein the predetermined pattern comprises a pattern in which one of the first display and the second display is made at least once and the other of the first display and the second display is continuously made a plurality of times.

2. An automated external defibrillator according to claim 1, wherein
the display unit has a first light source and a second light source,
the first display is to turn on the first light source to thereby display a first color on the display unit, and
the second display is to turn on the second light source to thereby display a second color different from the first color on the display unit.

3. An automated external defibrillator according to claim 2, wherein
each of the first light source and the second light source is an LED light source.

4. An automated external defibrillator according to claim 2, wherein
the display unit displays colors including at least the first color and the second color in turn when the automated external defibrillator is self-testing.

5. The automated external defibrillator of claim 2, wherein when automated external defibrillator is self-testing, the first display and the second display are made simultaneously by displaying the first color and the second color at separate places of the display unit.

6. The automated external defibrillator of claim 2, wherein when automated external defibrillator is self-testing, the first display and the second display are made simultaneously by mixing the first color and the second color.

7. An automated external defibrillator according to claim 1, wherein
- length of each time of the first display made when the automated external defibrillator is self-testing is shorter than length of a time for which the first display is made when the automated external defibrillator is in the normal state; and
- length of each time of the second display made when the automated external defibrillator is self-testing is shorter than length of a time for which the second display is made when the automated external defibrillator is in the abnormal state.

8. The automated external defibrillator of claim 1, wherein the predetermined pattern comprises a pattern in which one of the first display and the second display is continuously made a plurality of times and the other of the first display and the second display is continuously made a plurality of times.

9. A method for displaying a state of an automated external defibrillator, the method making the automated external defibrillator perform:
- an execution step of executing a self-test for checking the state of the automated external defibrillator; and
- a display step of indicating the state of the automated external defibrillator, wherein
- the display step includes
  - a first display step of making a first display when the automated external defibrillator is in a normal state,
  - a second display step of making a second display when the automated external defibrillator is in an abnormal state, and
  - a third display step of making the first display and the second display simultaneously or in a predetermined pattern when the automated external defibrillator is self-testing, wherein the predetermined pattern comprises a pattern in which one of the first display and the second display is made at least once and the other of the first display and the second display is continuously made a plurality of times.

10. An automated external defibrillator comprising:
- a self-test executor that executes a self-test for checking a state of the automated external defibrillator; and
- a display unit that indicates the state of the automated external defibrillator, wherein
- the display unit
  - makes a first display when the automated external defibrillator is in a normal state,
  - makes a second display when the automated external defibrillator is in an abnormal state, and
  - makes the first display and the second display in a predetermined pattern in which the first display and the second display are made alternately and one at a time when the automated external defibrillator is self-testing, wherein
- each lighting time of the first display when the automated external defibrillator is self-testing is shorter than a lighting time of the first display when the automated external defibrillator is in a normal state, and wherein
- each lighting time of the second display when the automated external defibrillator is self-testing is shorter than a lighting time of the second display when the automated external defibrillator is in an abnormal state.

* * * * *